United States Patent
Lee

(12) 
(10) Patent No.: US 6,285,403 B1
(45) Date of Patent: Sep. 4, 2001

(54) DATA SLICE CIRCUIT FOR SLICING DATA CARRIED ON A VIDEO SIGNAL AND A METHOD THEREOF

(75) Inventor: Heung-Bae Lee, Kwonson-gu (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/075,220

(22) Filed: May 11, 1998

(30) Foreign Application Priority Data

May 12, 1997 (KR) ................................................. 97-18235

(51) Int. Cl.[7] .............................. H04N 7/00; H04N 11/00
(52) U.S. Cl. ........................... 348/465; 348/468; 348/461
(58) Field of Search ...................................... 348/461, 465, 348/467, 468, 473, 474, 476, 478; H04N 7/08, 7/00, 11/00

(56) References Cited

U.S. PATENT DOCUMENTS

| | | | | |
|---|---|---|---|---|
| 4,115,811 | * | 9/1978 | Goff | 348/465 |
| 5,301,023 | * | 4/1994 | Zato | 348/476 |
| 5,404,172 | * | 4/1995 | Berman et al. | 348/465 |
| 5,521,645 | * | 5/1996 | Ezaki | 348/465 |
| 5,589,886 | * | 12/1996 | Ezaki | 348/468 |

* cited by examiner

Primary Examiner—Michael Lee
(74) Attorney, Agent, or Firm—Staas & Halsey LLP

(57) ABSTRACT

A data slice circuit to separate data carried on a video signal only at a line on which the data is carried and a method thereof. The circuit includes a top peak detector to detect a top peak of an input video signal to generate a top peak detection signal and a bottom peak detector to detect a bottom peak of the video signal to generate a bottom peak detection signal. A composite synchronous signal separation circuit separates a composite synchronous signal from the video signal, and a clock run-in window circuit generates a first control signal for a clock run-in interval. A sampling/holding circuit samples an intermediate value between the top peak detection signal and the bottom peak detection signal in response to the first control signal of a first state, and holds the sampled intermediate value to generate a reference voltage in response to the first control signal of a second state. A second control signal generator receiving the composite synchronous signal generates a second control signal indicating a line on which data is carried, and a comparator circuit compares the video signal with the reference signal in response to the second control signal. Therefore, the data slice circuit performs a data slice operation only at the line on which the data is carried.

20 Claims, 6 Drawing Sheets

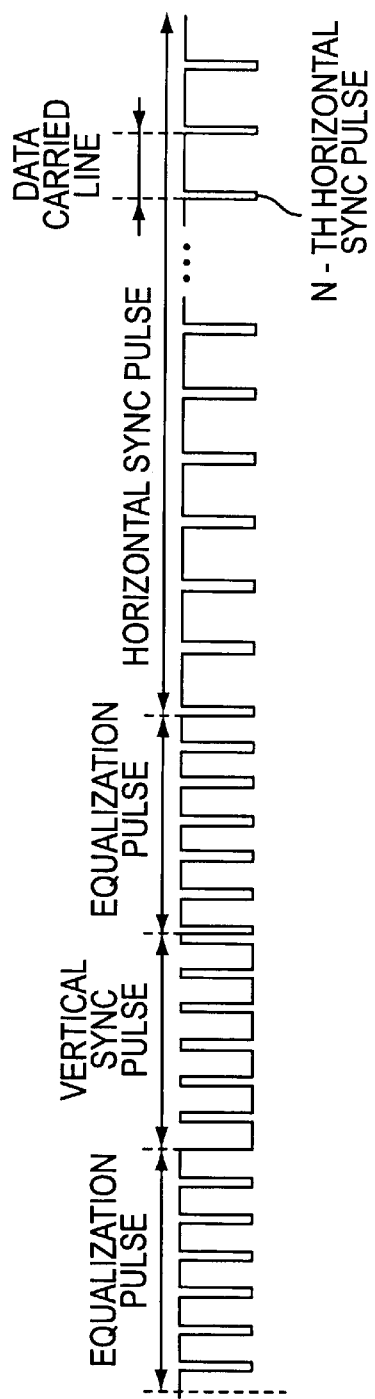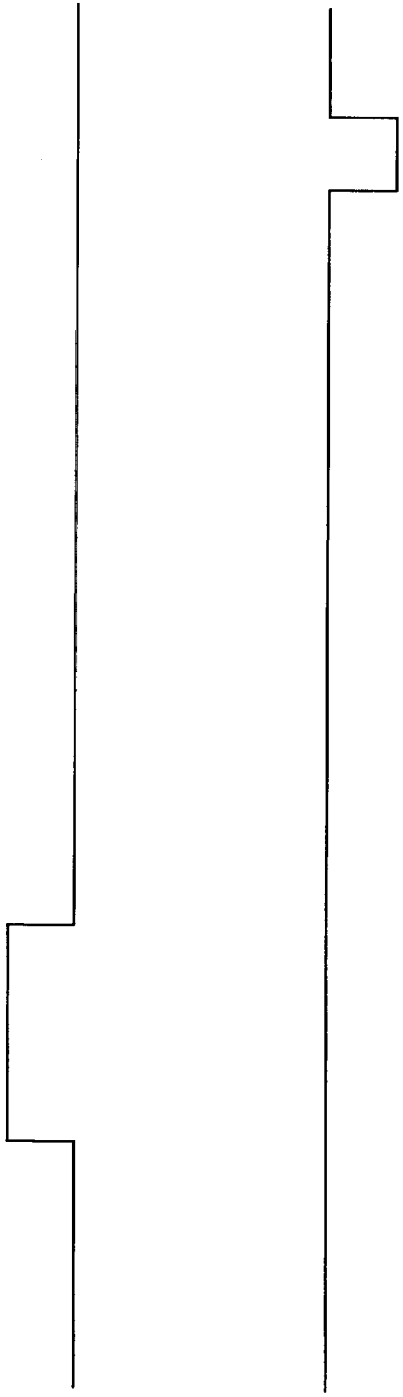

DATA SLICE CIRCUIT FOR SLICING DATA CARRIED ON A VIDEO SIGNAL AND A METHOD THEREOF

BACKGROUND OF THE INVENTION

1. Field of the Invention

The present invention relates to a video signal processing device and a method thereof, and in particular, to a data slice circuit for separating (slicing) data carried on a video signal and a method thereof.

2. Description of the Related Art

Commonly, a broadcasting station transmits a broadcasting signal together with data for a broadcasting program service (e.g., KBPS (Korean Broadcasting Program Service), a caption service, a teletext service and an extended data service (EDS)), being carried on the video signal at a vertical blanking interval (VBI).

Receiving the broadcasting signal, a television receiver separates the data carried on the video signal at the vertical blanking interval and displays information according to the data to offer the various services mentioned above. The television receiver includes a data slice circuit for separating the data carried on the video signal at the vertical blanking interval.

Referring to FIG. 1 illustrating a conventional data slice circuit, the video signal input is applied in common to a top peak detector 10, a bottom peak detector 12, a composite synchronous signal separation circuit 16, and a non-inverse input terminal (+) of a comparator circuit 20. The top peak detector 10 detects a top peak of the video signal and generates a top peak detection signal. The bottom peak detector 12 detects a bottom peak of the video signal and generates a bottom peak detection signal. The top peak detection signal reaches an input node P of a sampling/holding circuit 14 through a resistor R1. Similarly, the bottom peak detection signal reaches the input node P of the sampling/holding circuit 14 via a resistor R2. The resistors R1 and R2 have the same resistance. Accordingly, the input node P of the sampling/holding circuit 14 has an intermediate signal between the top peak detection signal and the bottom peak detection signal. The intermediate signal (hereinafter referred to as "sampling/holding signal") is applied to the sampling/holding circuit 14.

The composite synchronous signal separation circuit 16 separates a composite synchronous signal from the input video signal. The composite synchronous signal is applied to a CRI (Clock Run In) window circuit 18. The CRI window circuit 18 generates a control signal to the sampling/holding circuit 14, in which the control signal is, for example, at a high state at a CRI interval of the composite synchronous signal, and is at a low state at the other intervals. For example, if the control signal is at the high state, the sampling/holding circuit 14 performs a sampling operation. However, in response to the control signal of the low state, the sampling/holding circuit 14 performs a holding operation.

The sampling/holding circuit 14 samples the sampling/holding signal input in response to the control signal of the high state, and holds the sampled sampling/holding signal in response to the control signal of the low state. An output signal of the sampling/holding circuit 14 becomes a reference signal.

The reference signal is applied to an inverse input terminal (−) of the comparator circuit 20. The comparator circuit 20 generates an output signal of the high state when the video signal input is higher than the reference signal, and the output signal of the low state when the video signal input is lower than the reference signal. Here, the output signal of the comparator circuit 20 becomes the data for the various services mentioned above.

In operation, the video signal shown in FIG. 2A is applied to the data slice circuit. The top peak detector 10 detects the top peak of the video signal and generates the top peak detection signal shown in FIG. 2B. The bottom peak detector 12 detects the bottom peak of the video signal and generates the bottom peak detection signal shown in FIG. 2C. The top peak detection signal and the bottom peak detection signal are applied to the input node P through the resistors R1 and R2, respectively, generating the sampling/holding signal shown in FIG. 2D. As shown in FIG. 2D, the sampling/holding signal is at an intermediate level between the top peak detection signal and the bottom peak detection signal. The sampling/holding signal is applied to the sampling/holding circuit 14.

An N-th composite synchronous signal of the video signal is separated from the video signal by the composite synchronous signal separation circuit 16 and applied to the CRI window circuit 18. The CRI window circuit 18 generates the control signal shown in FIG. 2E of the high state to cause the sampling/holding circuit 14 to perform the sampling operation only at the CRI interval on the basis of the N-th composite synchronous signal. Upon receiving the control signal of the high state, the sampling/holding circuit 14 samples the sampling/holding input signal, to generate the reference signal shown in FIG. 2F.

As the CRI interval comes to an end, the control signal is changed to the low state, responsive to which the sampling/holding circuit 14 holds the sampled sampling/holding signal. Accordingly, the sampling/holding circuit 14 generates the reference signal at a time point where the control signal is changed to the low state. The reference voltage is applied to the inverse input terminal (−) of the comparator circuit 20.

The comparator circuit 20 generates the output signal as shown in FIG. 2G of the high state when the video signal is higher than the reference voltage. The output data of the comparator circuit 20 is identical to the data carried on the video data at a data interval.

With respect to the video signal, an actual video signal is generated after the vertical synchronous signal. However, a holding interval of the sampling/holding circuit 14 continues until the actual video signal is generated. Hence, the comparator circuit 20 generates the data with respect to even the actual video signal.

However, the data generated by the actual video signal is not the data which is transmitted from the transmission party (broadcasting station) for the services mentioned above. Accordingly, the data generated by the actual video signal causes noises.

As described above, the conventional data slice circuit performs a data slice operation with respect to the video signal even at an interval other than the data interval of the video signal. As a result, the data slice circuit slices even the actual video signal, thereby generating the noises.

SUMMARY OF THE INVENTION

It is therefore an object of the present invention to provide a data slice circuit for performing a data lice operation only at a data interval of the video signal.

Additional objects and advantages of the invention will be set forth in part in the description which follows and, in part, will be obvious from the description, or may be learned by practice of the invention.

To achieve the above and other objects of the present invention, there is provided a data slice circuit including a top peak detector to detect a top peak of an input video signal to generate a top peak detection signal and a bottom peak detector to detect a bottom peak of the video signal to generate a bottom peak detection signal. A composite synchronous signal separation circuit separates a composite synchronous signal from the video signal, and a clock run-in window circuit generates a first control signal for a clock run-in interval. A sampling/holding circuit samples an intermediate value between the top peak detection signal and the bottom peak detection signal in response to the first control signal of a first state, and holds the sampled intermediate value to generate a reference voltage in response to the first control signal of a second state. A second control signal generator receiving the composite synchronous signal generates a second control signal at a line on which data is carried, and a comparator circuit compares the video signal with the reference signal in response to the second control signal. Therefore, the data slice circuit performs a data slice operation only at the line on which the data is carried.

Here, the first control signal is at the first state while the composite synchronous signal is at the clock run-in interval, and is at the second state while the composite synchronous signal is at an interval other than the clock run-in interval.

BRIEF DESCRIPTION OF THE DRAWINGS

The above and other objects and advantages of the present invention will become more apparent by describing in detail a preferred embodiment thereof with reference to the attached drawings in which:

FIGS. 5A through 5C are diagrams illustrating waveforms at different parts of the data slice circuit shown in FIG. 3.

DETAILED DESCRIPTION OF THE PREFERRED EMBODIMENT

Figure 1:
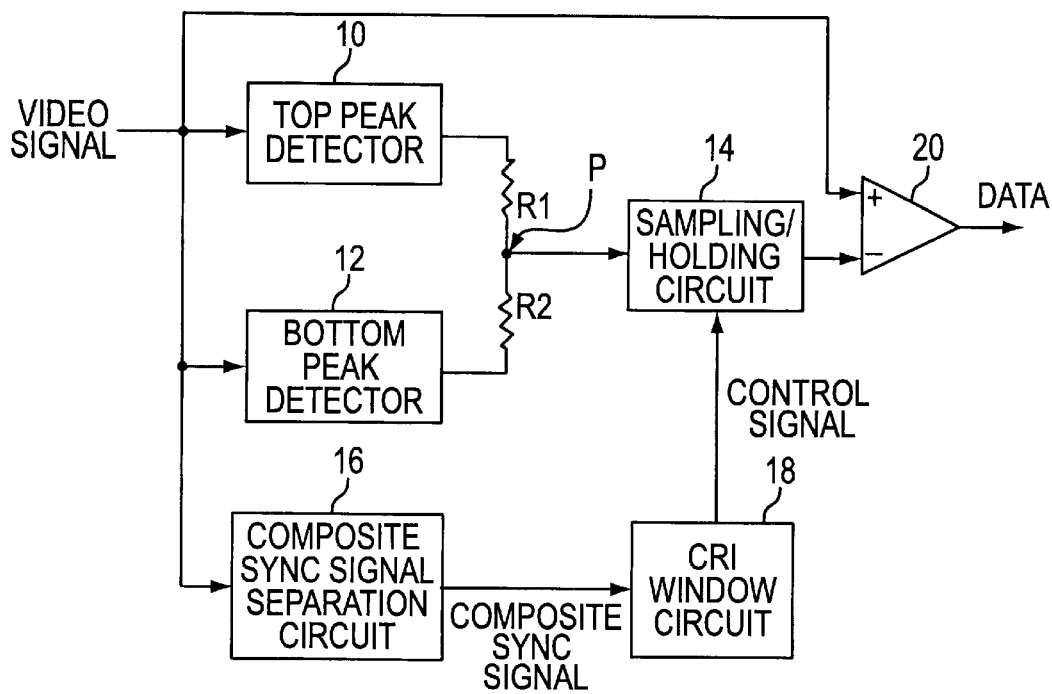
FIG. 1 is a block diagram of a conventional data slice circuit.
Figure 2:
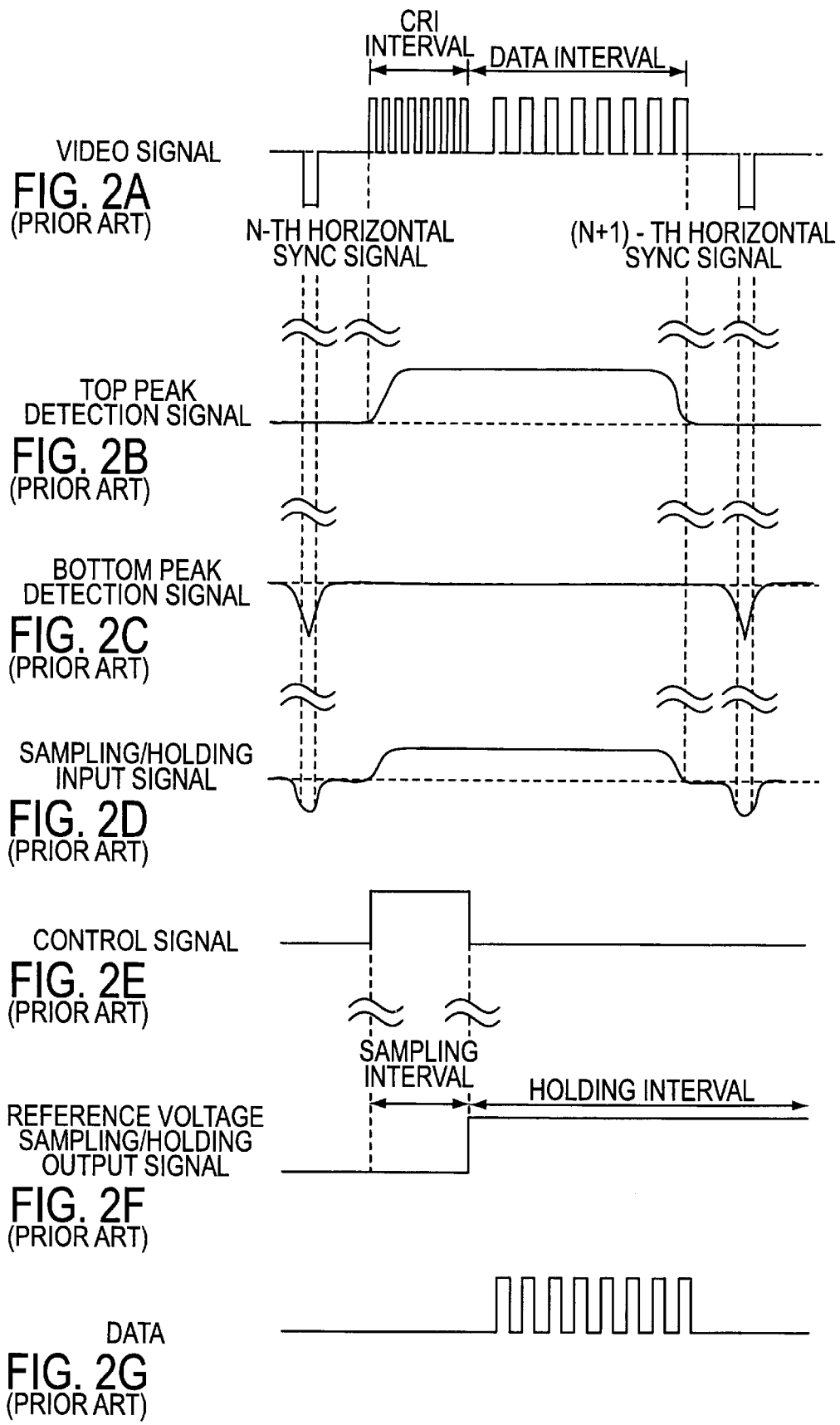
FIGS. 2A through FIG. 2G are diagrams illustrating waveforms at different parts of the data slice circuit of FIG. 1.

A preferred embodiment of the present invention will be described in detail referring to the attached drawings, in which the like reference numerals denote the same elements in the drawings, for understanding. Though the specific embodiment will be exemplarily defined and described in detail to clarify the subject matter of the present invention, the present invention may be implemented with the description of the present invention by those skilled in the art even without the details. In addition, an unnecessary detailed description of widely known functions and constructions may be avoided here.

Figure 3:
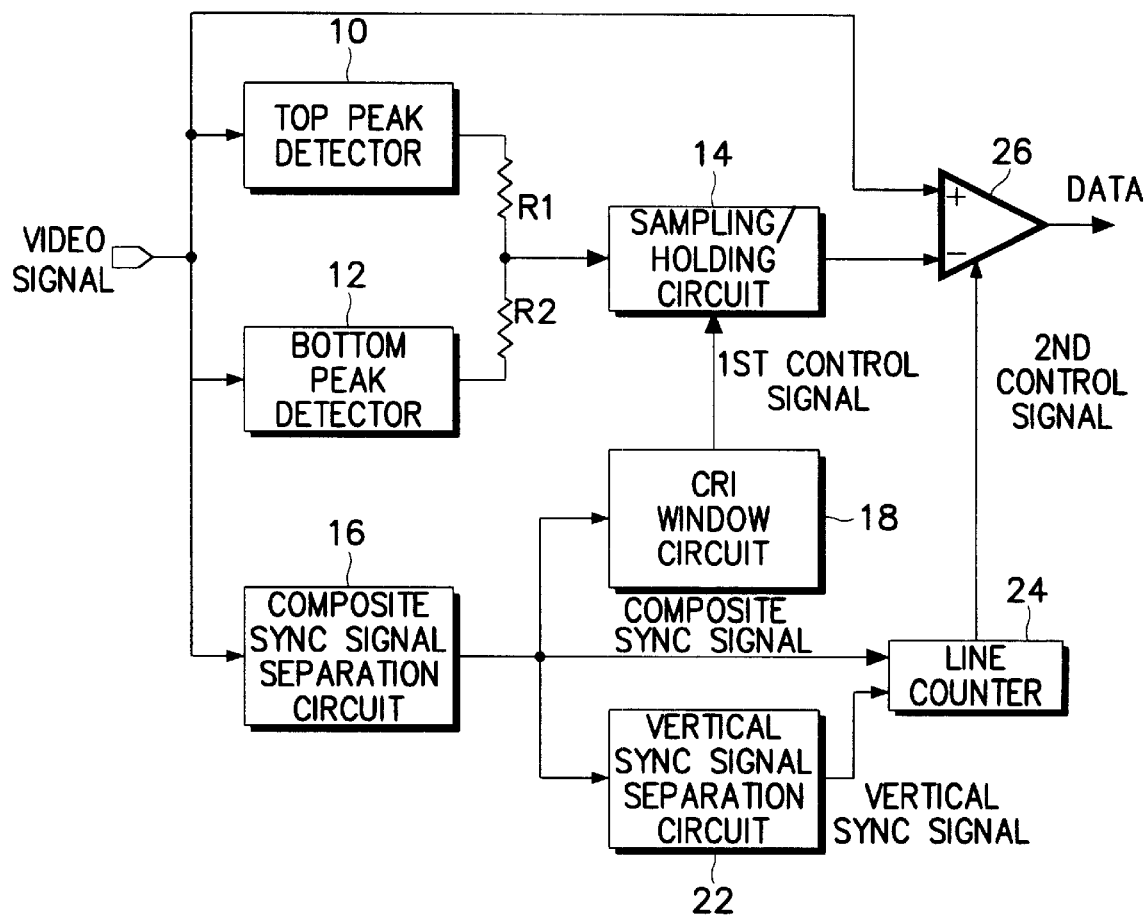
FIG. 3 is a block diagram of a data slice circuit according to an embodiment of the present invention.

FIG. 3 shows a data slice circuit according to a preferred embodiment of the present invention, in which a video signal input is applied in common to a top peak detector 10, a bottom peak detector 12, a composite synchronous signal separation circuit 16, and a non-inverse input terminal (+) of a comparator circuit 26. The top peak detector 10 and the bottom peak detector 12 detect the top and bottom peaks of the video signal to generate the top and bottom peak detection signals, respectively, in the same way as described hereinbefore.

The resistors R1 and R2 generate an intermediate value between the top peak detection signal and the bottom peak detection signal, in the same way as described hereinbefore. The intermediate value becomes a sampling/holding signal which is applied to the sampling/holding circuit 14.

Further, the composite synchronous signal separation circuit 16 separates a composite synchronous signal from the video signal as described hereinbefore. The composite synchronous signal is applied to a CRI window circuit 18. The CRI window circuit 18 generates a first control signal which is at the high state at the CRI interval and at the low state at an interval other than the CRI interval. The first control signal is applied to the sampling/holding circuit 14. The sampling/holding circuit 14 samples the sampling/holding signal in response to the first control signal of the high state and holds the sampled sampling/holding signal in response to the first control signal of the low state, to thereby generate a stable reference signal to an inverse input terminal (−) of the comparator circuit 26.

Further, the composite synchronous signal output from the composite synchronous signal separation circuit 16 is applied in common to a vertical synchronous signal separation circuit 22 and a line counter circuit 24. The vertical synchronous signal separation circuit 22 separates a vertical synchronous signal from the composite synchronous signal and includes a lowpass filter.

The vertical synchronous signal is applied to the line counter circuit 24. The line counter circuit 24 receives the composite synchronous signal and the vertical synchronous signal, to count the composite synchronous signal being generated after the vertical synchronous signal. The line counter circuit 24 generates an output signal of the low state, each time the next composite synchronous signal is generated beginning at a time point where the count value reaches a preset value. Here, an interval between a synchronous signal and the next synchronous signal is called a line. Namely, the line counter circuit 24 generates a second control signal which is at the low state at a preset line after the vertical synchronous signal, and is at the high state at an interval other than the preset line.

Figure 6:
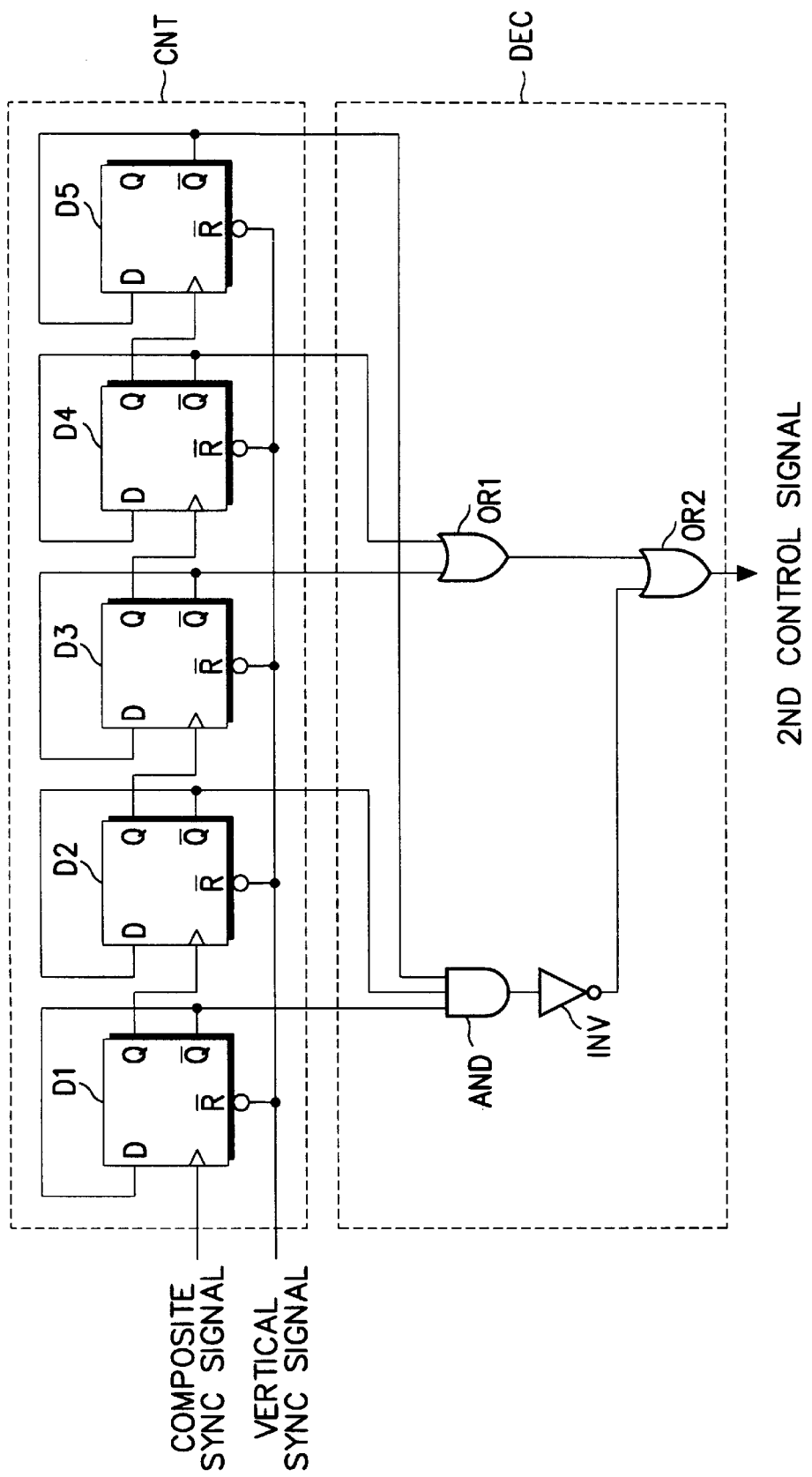
FIG. 6 is a detailed circuit diagram of a line counter circuit shown in FIG. 3.

In case the preset line is a $19^{th}$ line (10011), the line counter circuit 24 is structured as illustrated in FIG. 6. Referring to FIG. 6, the line counter circuit 24 includes a counter CNT and a decoder DEC. The counter CNT includes first through fifth D flip-flops D1–D5, of which respective reset terminals /R are connected to the vertical synchronous signal. Thus, each time the vertical synchronous signal is received, the first through fifth D flip-flops D1–D5 are reset.

In addition, the composite synchronous signal is applied to a clock terminal of the first D flip-flop D1. Clock terminals of the second through fifth D flip-flops D2–D5 are connected to output terminals Q of the preceding flip-flops, respectively. Input terminals D of the first through fifth D flip-flops D1–D5 are connected to output terminals /Q thereof, and the counter CNT outputs the count value through the output terminals /Q of the first through fifth D flip-flops D1–D5.

Since the line is preset to the $19^{th}$ line, the count value is "10011". Accordingly, when the counter CNT has counted the $19^{th}$ line, the first D flip-flop D1 outputs "1" at the output terminal /Q thereof, the second D flip-flop D2 outputs "1" at its output terminal /Q, the third D flip-flop D3 outputs "0" at its output terminal /Q, the fourth D flip-flop D4 outputs "0" at its output terminal /Q, and the fifth D flip-flop D5 outputs "1" at its output terminal /Q.

The decoder DEC comprises an AND gate AND, first and second OR gates OR1 and OR2, and an inverter INV. The decoder DEC generates an output signal of the low state, only when the counter CNT outputs the count value of "11001".

The AND gate receives as inputs the output signals at the output terminals /Q of the first, second and fifth D flip-flops D1, D2 and D5, and generates an output signal of the high state, only when those three output signals are all at the high state. The first OR gate OR1 inputs the output signals at the output terminals /Q of the third and fourth D flip-flops D3 and D4, and generates an output signal of the low state, only when those two output signals are both at the low state.

The output signal of the AND gate is inverted by the inverter INV and applied to an input terminal of the second OR gate OR2. The output signal of the first OR gate OR1 is applied to another input terminal of the second OR gate OR2. The second OR gate OR2 generates an output signal of the low state, only when the output signals of the inverter INV and the first OR gate OR1 are both at the low state.

That is, the second OR gate OR2 generates the output signal of the low state, when the count value obtained by counting the composite synchronous signal upon generation of the vertical synchronous signal is coincident with the preset line number. The output signal of the low state is maintained until the next composite synchronous signal is generated.

The output signal of the line counter 24 is applied to the comparator circuit 26 as the second control signal. The comparator circuit 26 is enabled in response to the second control signal of the high state. The comparator circuit 26 inputs the video signal at the non-inverse input terminal (+) and the reference voltage at the inverse input terminal (-), and generates the output data of the high state when the video signal is higher than the reference voltage and the output data of the low sate when the video signal is lower than the reference voltage. The detailed structure of the comparator circuit 26 is illustrated in FIG. 4.

Figure 4:
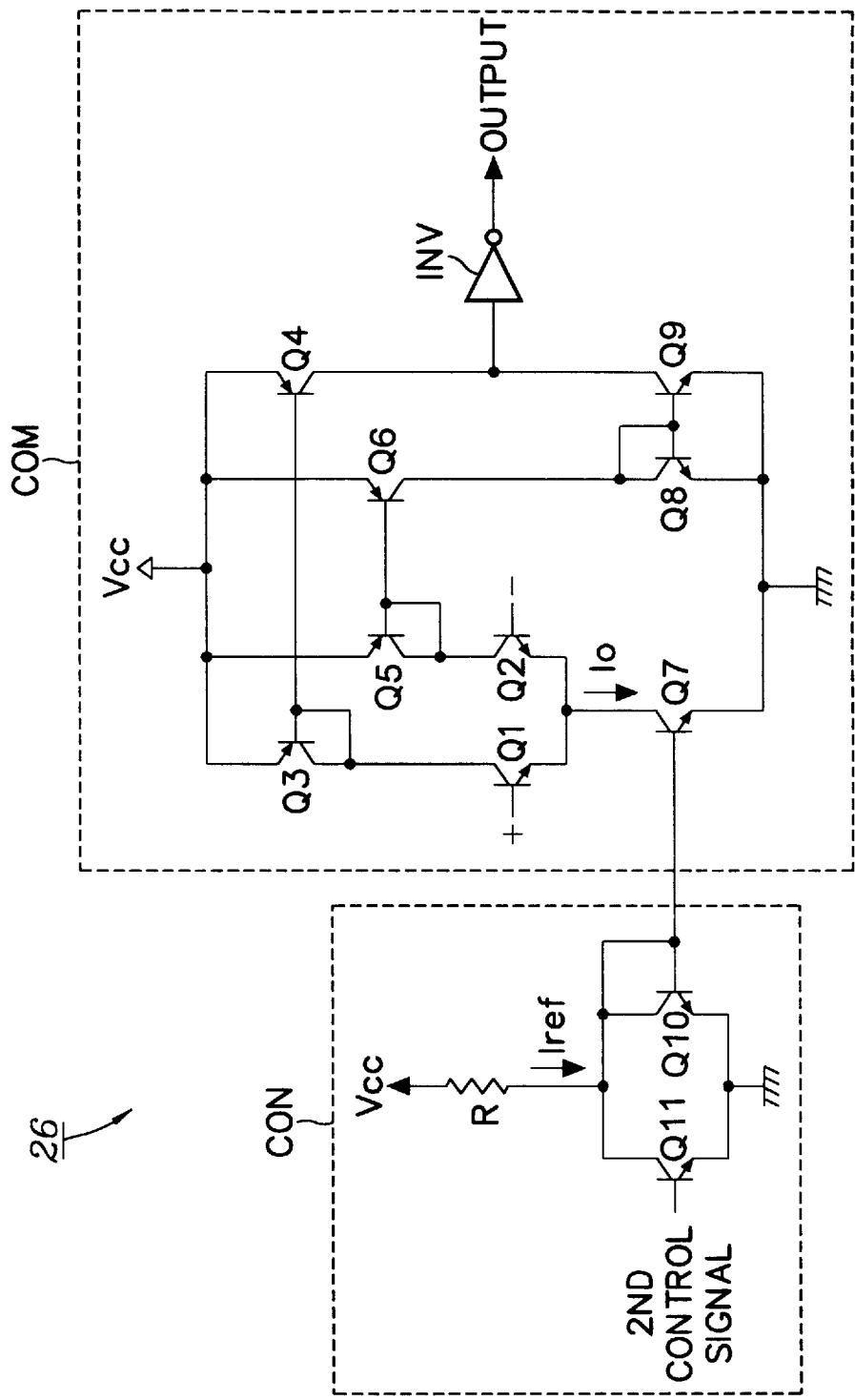
FIG. 4 is a detailed circuit diagram of a comparator circuit shown in FIG. 3.

Referring to FIG. 4, the comparator circuit 26 includes a comparator COM and a controller CON. First, a resistance of a resistor R is set such that a current Io of the comparator COM is identical to a reference current Iref of the controller CON. An eleventh transistor Q11 of the controller CON has a base connected to the second control signal, a collector connected to the supply voltage Vcc via the resistor R, and an emitter connected to the ground. A tenth transistor Q10 has a base connected to a base of a seventh transistor Q7 in the comparator COM, and an emitter connected to the ground. Further, a collector of the tenth transistor Q10 is connected to the supply voltage Vcc via the resistor R and to the base thereof.

When the second control signal is at the high state, the reference current Iref flows through the eleventh transistor Q11, so that the base of the tenth transistor Q10 is at the low state. Thus, the seventh transistor Q7 is turned off.

However, if the second control signal is at the low state, the reference current Iref flows through the tenth transistor Q10, and the base of the tenth transistor Q10 is at the high state. As a result, the seventh transistor Q7 is turned on.

The video signal applied to the non-inverse input terminal (+) of the comparator COM is applied to a base of a first transistor Q1, and the reference voltage applied to the inverse input terminal (-) is applied to a base of a second transistor Q2. Emitters of the first and second transistors Q1 and Q2 are connected in common to a collector of the seventh transistor Q7. Further, the seventh transistor Q7 has the base connected to the base of the tenth transistor Q10 and an emitter connected to the ground.

Further, a collector of the first transistor Q1 is connected in common to a collector and a base of a third transistor Q3. Similarly, a collector of the second transistor Q2 is connected in common to a collector and a base of a fifth transistor Q5 and to a base of the sixth transistor Q6. Emitters of the third and fourth transistor Q3 and Q4 are connected in common to the supply voltage Vcc. The base of the third transistor Q3 is connected to a base of the fourth transistor Q4. A collector of the fourth transistor Q4 is connected to an input terminal of an inverter INV and a collector of a ninth transistor Q9. A base of the ninth transistor Q9 is connected in common to a base and a collector of an eighth transistor Q8 and to a collector of a sixth transistor Q6. Emitters of the eighth and ninth transistors Q8 and Q9 are connected in common to the ground.

Here, the third and fourth transistors Q3 and Q4 constitute a mirror circuit. Similarly, the eighth and ninth transistors Q8 and Q9 constitute another mirror circuit.

In operation, if the second control signal of the high state is applied to the controller CON of the comparator circuit 26, the collector of the tenth transistor Q10 is at the low state. Then, the seventh transistor Q7 whose base is connected to the collector of the tenth transistor Q10 is turned off, and a current path for the current Io is cut off. As a result, the comparator COM is inactivated.

On the contrary, when the second control signal of the low state is applied to the controller CON, the tenth transistor Q10 generates the high state at the collector thereof. Then, the seventh transistor Q7 whose base is connected to the collector of the tenth transistor Q10 is turned on, and the current path for the current Io is connected. As a result, the comparator COM is activated.

The second control signal is at the low state only at the line on which the data is carried. Accordingly, the comparator circuit 26 performs the data slice operation only at the line on which the data is carried.

In describing the operation of the data slice circuit of the invention to which the video signal is applied, the composite synchronous signal separation circuit 16 outputs the composite synchronous signal as shown in FIG. 5A upon receiving the video signal. The composite synchronous signal includes equalization pulses, vertical synchronous pulses, and horizontal synchronous pulses. The vertical synchronous signal separation circuit 22 separates the vertical synchronous signal from the composite synchronous signal to generate the vertical synchronous signal as shown in FIG. 5B.

The line counter 24 inputs the vertical synchronous signal to start line counting, and generates the second control signal of the low state for one line if the count value becomes the preset value as shown in FIG. 5C. Receiving the second control signal, the comparator circuit 26 performs the data slice operation only at the line where the second control signal is at the low state.

As described above, the data slice circuit of the invention performs the data slice operation only at the line on which the data is carried, thereby preventing generation of the noises.

Although an illustrative embodiment of the present invention have been described herein with reference to the accompanying drawings, it is to be understood that the present invention is not limited to this precise embodiment, and that various other changes and modifications may be affected therein by one skilled in the art without departing from the scope or spirit of the invention.

What is claimed is:

1. A data slice circuit to perform a data slice operation on an input video signal, comprising:
   a top peak detector to detect a top peak of an input video signal to generate a top peak detection signal;
   a bottom peak detector to detect a bottom peak of said input video signal to generate a bottom peak detection signal;
   a composite synchronous signal separation circuit to separate a composite synchronous signal from said input video signal;
   a clock run-in window circuit to generate a first control signal for a clock run-in interval based upon said composite synchronous signal;
   a sampling/holding circuit to sample an intermediate value between said top peak detection signal and said bottom peak detection signal in response to said first control signal of a first state, and holding the sampled intermediate value to generate a reference voltage in response to said first control signal of a second state;
   a control signal generator to receive said composite synchronous signal and, in response, generate a second control signal indicating a line on which data of the input video signal is being carried; and
   a comparator circuit to compare said input video signal with said reference signal in response to said second control signal;
   whereby the data slice circuit performs the data slice operation at the line on which the data is carried.

2. The data slice circuit as claimed in claim 1, wherein said first control signal is at the first state while the composite synchronous signal is at the clock run-in interval, and is at the second state while the composite synchronous signal is at an interval other than said clock run-in interval.

3. The data slice circuit as claimed in claim 1, wherein said control signal generator comprises:
   a vertical synchronous signal separation circuit to separate a vertical synchronous signal from said composite synchronous signal; and
   a line counter to count said composite synchronous signal after said vertical synchronous signal, and if a count value thereof becomes a preset value, generating said second control signal until a next composite synchronous signal is generated.

4. A data slice circuit to separate data carried on a video signal, comprising:
   a slice operation unit to separate the data carried on the video signal based on a clock run-in control signal; and
   a control unit to enable operation of said slice operation unit at a line on which the data of the video signal is carried, based on composite and vertical synchronous signals of the video signal.

5. The data slice unit as claimed in claim 4, wherein said slice operation unit comprises:
   a top peak detector to detect a top peak of the video signal, to generate a top peak signal;
   a bottom peak detector to detect a bottom peak of the video signal, to generate a bottom peak signal;
   a composite synchronous signal separation circuit to separate the composite synchronous signal from the video signal;
   a clock run-in window circuit to generate the clock run-in control signal for a clock run-in interval based upon the composite synchronous signal;
   an intermediate signal generator to generate an intermediate signal from the top and bottom peak signals;
   a sampling/holding circuit to sample the intermediate signal in response to the first signal being in a first state and to hold the intermediate signal in response to the clock run-in control signal being in a second state, to generate a reference signal; and
   a comparator unit to compare the video signal with the reference signal;
   wherein said control unit enables said comparator unit at the line on which the data of the video signal is carried.

6. The data slice circuit as claimed in claim 5, wherein said intermediate signal generator comprises:
   a first resistor having a resistance value, a first end connected to said top peak detector and a second end connected to a node; and
   a second resistor having the resistance value, a first end connected to said bottom peak detector and a second end connected to the node;
   wherein the node is connected to said sampling/holding circuit.

7. The data slice circuit as claimed in claim 4, wherein:
   said slice operation unit determines the composite synchronous signal from the video signal; and
   said control unit separates the vertical synchronous signal from the composite synchronous signal, counts the composite synchronous signal subsequent to the vertical synchronous signal, and enables the operation of said slice operation unit at a predetermined count value and until a next composite synchronous signal is generated subsequent to the predetermined count value.

8. The data slice circuit as claimed in claim 5, wherein said control unit separates the vertical synchronous signal from the composite synchronous signal, counts the composite synchronous signal subsequent to the vertical synchronous signal, and enables said comparator unit at a predetermined count value and until a next composite synchronous signal is generated subsequent to the predetermined count value.

9. The data slice circuit as claimed in claim 4, wherein:
   said slice operation unit generates the composite synchronous signal from the video signal; and
   said control unit comprises
      a vertical synchronous signal separator to separate the vertical synchronous signal from the composite video signal, and
      a line counter to count the composite synchronous signal after the vertical synchronous signal, and to generate a control signal at a predetermined count value of the composite synchronous signal until a next composite synchronous signal is generated subsequent to the predetermined count value, said control signal enabling the operation of said slice operation unit.

10. The data slice circuit as claimed in claim 5, wherein said control unit comprises:
    a vertical synchronous signal separator to separate the vertical synchronous signal from the composite video signal; and
    a line counter to count the composite synchronous signal after the vertical synchronous signal, and to generate a second control signal at a predetermined count value of the composite synchronous signal until a next composite synchronous signal is generated subsequent to the predetermined count value, said second control signal enabling the operation of said slice operation unit.

11. The data slice circuit as claimed in claim 6, wherein said control unit comprises:

a vertical synchronous signal separator to separate the vertical synchronous signal from the composite video signal; and a line counter to count the composite synchronous signal after the vertical synchronous signal, and to generate a second control signal at a predetermined count value of the composite synchronous signal until a next composite synchronous signal is generated subsequent to the predetermined count value, said second control signal enabling the operation of said slice operation unit.

12. The data slice circuit as claimed in claim 4, wherein said control unit comprises:

a vertical synchronous signal separator to separate the vertical synchronous signal from the composite video signal; and a line counter to count the composite synchronous signal after the vertical synchronous signal, and to generate a control signal in a first state indicating the line after the vertical synchronous signal and predetermined count value of the composite synchronous signal until a next composite synchronous signal is generated subsequent to the predetermined count value, and to generate the control signal in a second state at all other times, wherein the control signal in the first state enables the comparator unit and the control signal in the second state disables the comparator unit.

13. The data slice circuit as claimed in claim 5, wherein said control unit comprises:

a vertical synchronous signal separator to separate the vertical synchronous signal from the composite video signal; and a line counter to count the composite synchronous signal after the vertical synchronous signal, and to generate a second control signal in a first state at the line after the vertical synchronous signal and predetermined count value of the composite synchronous signal until a next composite synchronous signal is generated subsequent to the predetermined count value, and to generate the second control signal in a second state at all other times, wherein the second control signal in the first state enables the comparator unit and the second control signal in the second state disables the comparator unit.

14. The data slice circuit as claimed in claim 9, wherein said line counter comprises:

a counter to count the composite synchronous signal and to be reset by the vertical synchronous signal; and a decoder to change a state of said control signal upon the counting of said counter to the predetermined count value.

15. A data slice circuit to separate data carried on a video signal, comprising:

a slice operation unit to separate the data carried on the video signal, said slice operation unit generates a composite synchronous signal from the video signal; and a control unit to enable operation of said slice operation unit at a line on which the data of the video signal is carried;

wherein said control unit has a vertical synchronous signal separator to separate a vertical synchronous signal from the composite video signal, and a line counter to count the composite synchronous signal after the vertical synchronous signal, and to generate a control signal at a predetermined count value of the composite synchronous signal until a next composite synchronous signal is generated subsequent to the predetermined count value, said control signal enabling the operation of said slice operation unit, and said line counter having a counter to count the composite synchronous signal and to be reset by the vertical synchronous signal and a decoder to change a state of said control signal upon the counting of said counter to the predetermined count value;

wherein said counter has a plurality of D flip-flops each having an input terminal D, a clock terminal, an output terminal Q, an output terminal /Q and a reset terminal /R, wherein said decoder has an AND gate, an inverter, a first OR gate, and a second OR gate; and wherein each of the reset terminals /R is connected to said vertical synchronous signal separator to receive the vertical synchronous signal, each of the Q output terminals of said plurality of D flip-flops except a last one is connected to the clock terminal of a following one, each input terminal D is connected to the output terminal /Q of the same D flip-flop and either said AND gate or said first OR gate, and the clock terminal of the first D flip-flop is connected to said slice operation unit to receive the composite synchronous signal from said slice operation unit, said AND gate performing an AND operation on signals received from the output terminals /Q connected thereto to generate a first logic signal, said OR gate performing a first OR operation on signals received from the output terminals /Q connected thereto to generate a second logic signal, said inverter inverting the first logic signal to generate an inverted first logic signal, and said second OR gate performing a second OR operation on the inverted first logic signal and the second logic signal to generate the control signal.

16. The data slice circuit as claimed in claim 10, wherein said line counter comprises:

a counter to count the composite synchronous signal and to be reset by the vertical synchronous signal; and a decoder to change a state of said control signal upon the counting of said counter to the predetermined count value.

17. A data slice circuit to separate data carried on a video signal, comprising:

a slice operation unit to separate the data carried on the video signal; and a control unit to enable operation of said slice operation unit at a line on which the data of the video signal is carried;

wherein the control unit has a top peak detector to detect a top peak of the video signal, to generate a top peak signal, a bottom peak detector to detect a bottom peak of the video signal, to generate a bottom peak signal, a composite synchronous signal separation circuit to separate a composite synchronous signal from the video signal, a clock run-in window circuit to generate a first control signal for a clock run-in interval based upon the composite synchronous signal, an intermediate signal generator to generate an intermediate signal from the top and bottom peak signals, a sampling/holding circuit to sample the intermediate signal in response to the first signal being in a first state and to hold the intermediate signal in response to the first control signal being in a second state, to generate a reference signal, a vertical synchronous signal separator to separate a vertical synchronous signal from the composite video signal, a comparator unit to compare the video signal with the reference signal, and a line counter to count the composite synchronous signal after the vertical synchronous signal, and to generate a second control signal at a predetermined count value of the composite synchronous signal until a next composite synchronous signal is generated subsequent to the predetermined count value, said second control signal enabling the operation of said slice operation unit, and said line counter having a counter to count the composite synchronous signal and to be reset by the vertical synchronous signal and a decoder to change a state of said control signal upon the counting of said counter to the predetermined count value;

wherein said counter has
  a plurality of D flip-flops each having an input terminal D, a clock terminal, an output terminal Q, an output terminal /Q and a reset terminal /R, wherein said decoder has
  an AND gate,
  an inverter,
  a first OR gate, and
  a second OR gate, and wherein each of the reset terminals /R is connected to said vertical synchronous signal separator to receive the vertical synchronous signal, each of the Q output terminals of said plurality of D flip-flops except a last one is connected to the clock terminal of a following one, each input terminal D is connected to the output terminal /Q of the same D flip-flop and either said AND gate or said first OR gate, and the clock terminal of the first D flip-flop is connected to said composite synchronous signal separation circuit to receive the composite synchronous signal, said AND gate performing an AND operation on signals received from the output terminals /Q connected thereto to generate a first logic signal, said OR gate performing a first OR operation on signals received from the output terminals /Q connected thereto to generate a second logic signal, said inverter inverting the first logic signal to generate an inverted first logic signal, and said second OR gate performing a second OR operation on the inverted first logic signal and the second logic signal to generate the second control signal; and wherein said control unit enables said comparator unit at the line on which the data of the video signal is carried.

18. A data slice circuit to separate data carried on a video signal, comprising:

a slice operation unit to separate the data carried on the video signal; and a control unit to enable operation of said slice operation unit at a line on which the data of the video signal is carried;

wherein the control unit has
  a top peak detector to detect a top peak of the video signal, to generate a top peak signal,
  a bottom peak detector to detect a bottom peak of the video signal, to generate a bottom peak signal,
  a composite synchronous signal separation circuit to separate a composite synchronous signal from the video signal,
  a clock run-in window circuit to generate a first control signal for a clock run-in interval based upon the composite synchronous signal,
  an intermediate signal generator to generate an intermediate signal from the top and bottom peak signals,
  a sampling/holding circuit to sample the intermediate signal in response to the first signal being in a first state and to hold the intermediate signal in response to the first control signal being in a second state, to generate a reference signal, and
  a comparator unit to compare the video signal with the reference signal;

wherein said comparator has
  a resistor having a first end to receive a predetermined voltage and a second end,
  a first transistor having a base to received the video signal, a collector and an emitter,
  a second transistor having a base to receive the reference signal, an emitter connected to the emitter of said first transistor and a collector,
  a third transistor having a base, a collector connected to the base and an emitter connected to the predetermined voltage,
  a fourth transistor having a based connected to the base of said third transistor an emitter connected to the predetermined voltage and a collector,
  a fifth transistor having an emitter connected to the predetermined voltage, a base and a collector connected to the base and the emitter of said second transistor,
  a sixth transistor having a base connected to the base of the fifth transistor, an emitter connected to the predetermined voltage and a collector,
  a seventh transistor having a collector connected to the emitters of the first and second transistors, a collector connected to another predetermined voltage and a base,
  an eighth transistor having an emitter connected to the another predetermined voltage, a collector connected to the emitter of the sixth transistor and a base connected to the collector thereof,
  a ninth transistor having a base connected to the base of the eighth transistor, an emitter connected to the another predetermined voltage and a collector connected to the emitter of the fourth transistor,
  a tenth transistor having an emitter connected to the another predetermined voltage, and a base and collector connected to the second end of the resistor, and
  an eleventh transistor having a base to receive the second control signal, an emitter connected to the another predetermined voltage and a collector connected to the collector of the tenth transistor and the second end of the resistor; and wherein said control unit enables said comparator unit at the line on which the data of the video signal is carried.

19. A method of slicing data carried on a video signal, comprising the steps of:
   separating the data carried on the video signal based on a clock run-in control signal; and
   enabling the step of separating the data during a data interval of the video signal and disabling the step of separating the data at all other times, based on composite and vertical synchronous signals of the video signal.

20. The method as claimed in claim 19, wherein said step of enabling and disabling comprises the steps of:
   separating the composite synchronous signal from the video signal;
   separating the vertical synchronous signal from the composite synchronous signal;
   counting the composite synchronous signal after the vertical synchronous signal;
   determining a predetermined count of the counted composite synchronous signal, and in response, generating the clock run-in control signal having a first state for enabling the step of separating the data; and
   generating the control signal having a second state for disabling the step of separating the data in response to a next composite synchronous signal.

* * * * *